United States Patent Office 3,524,964
Patented Aug. 18, 1970

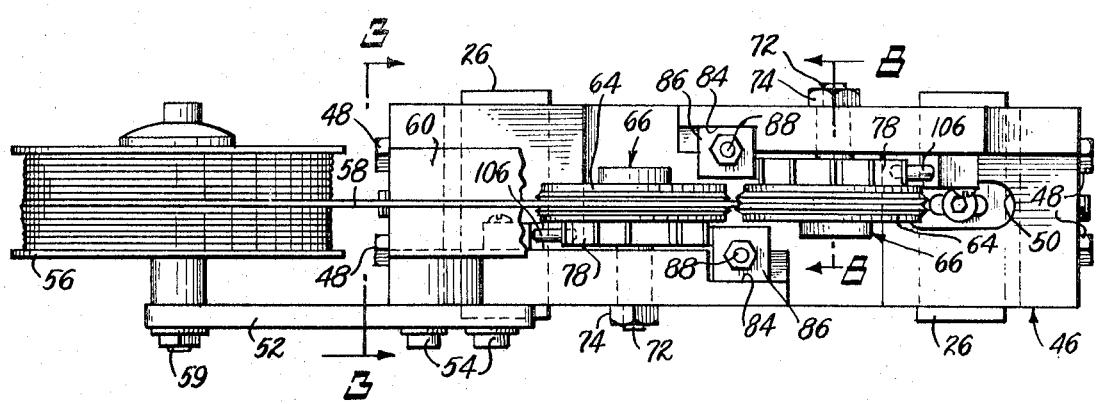
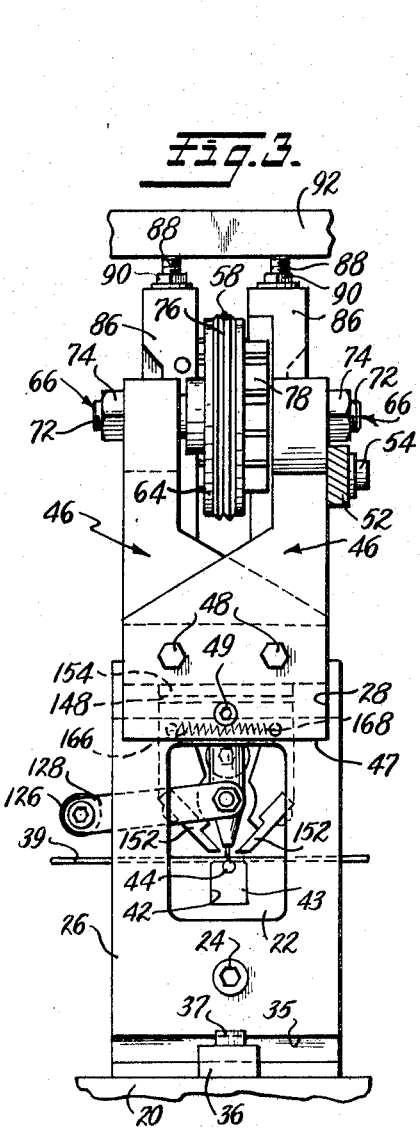
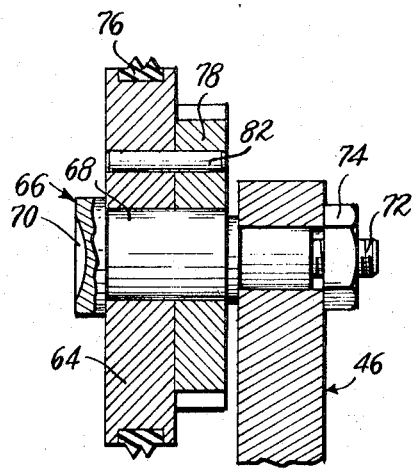
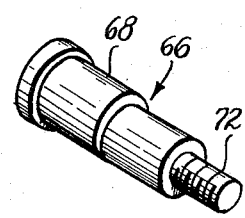
Aug. 18, 1970  R. D. MILLIMAN  3,524,964
ELECTRICAL CONTACT WELDER
Filed July 20, 1966  4 Sheets-Sheet 2
Fig. 2.
Fig. 3.
Fig. 8.
Fig. 9.
INVENTOR.
ROGER D. MILLIMAN
BY
Robert E. Strausser
ATTORNEY

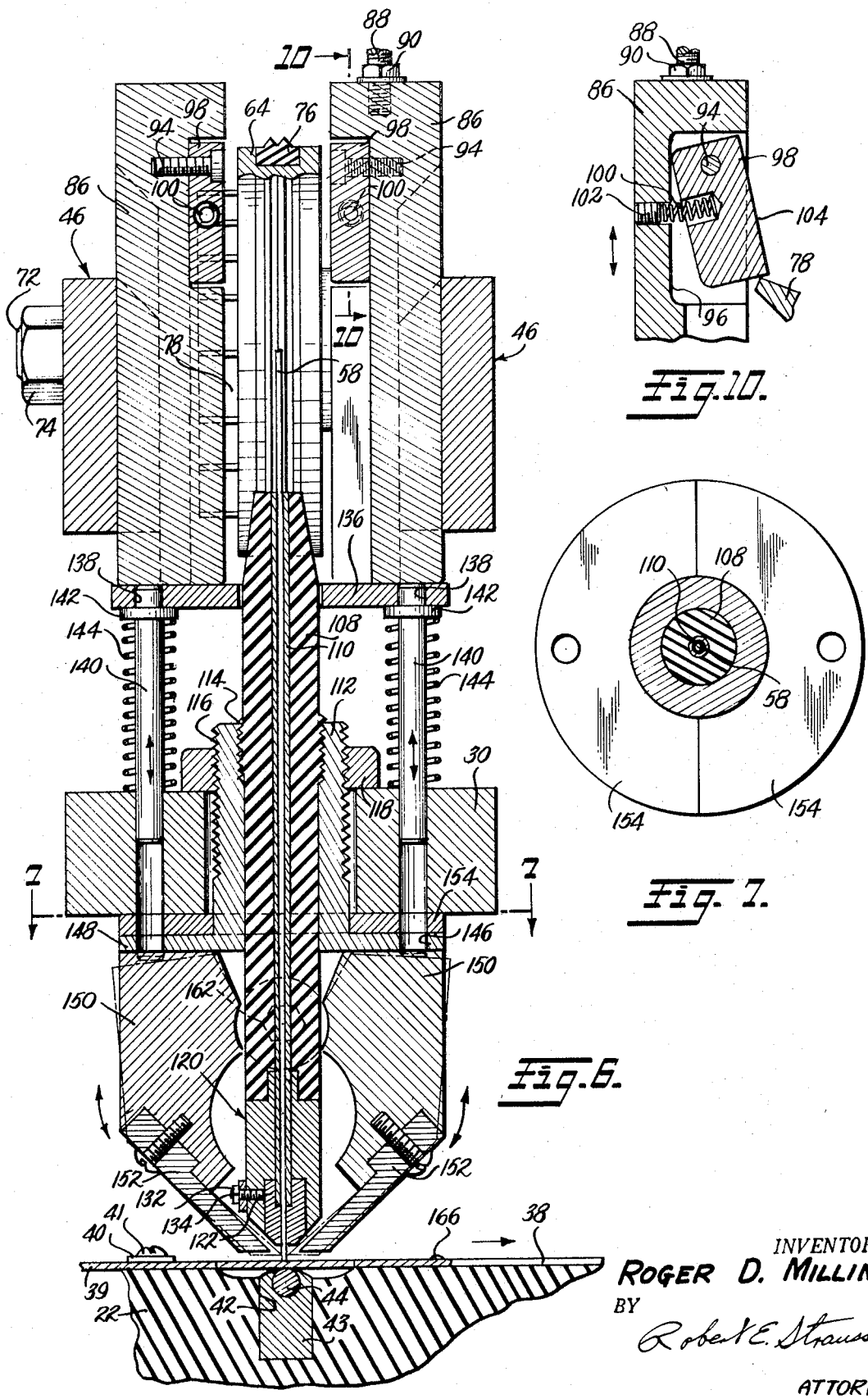

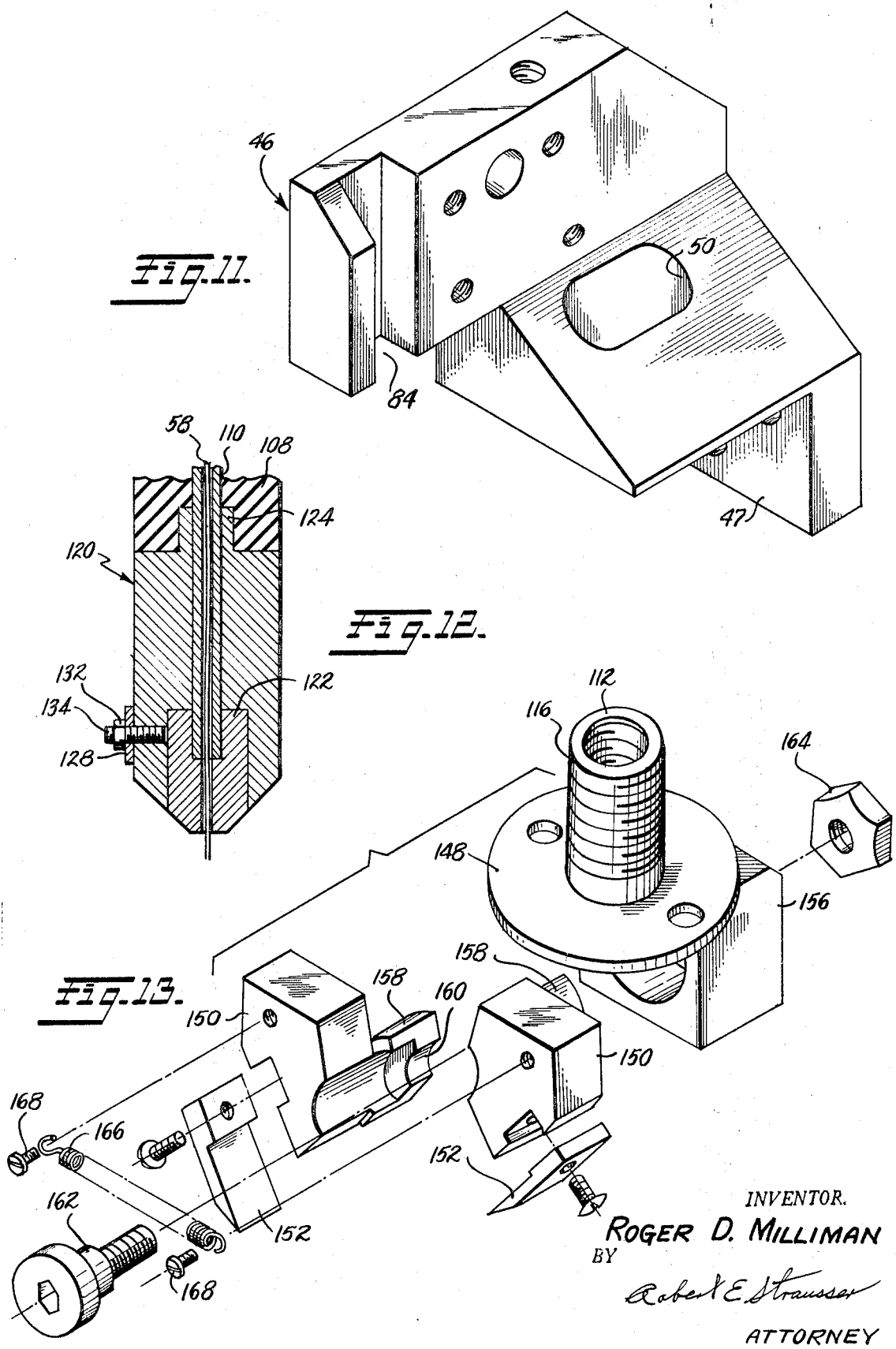

3,524,964
ELECTRICAL CONTACT WELDER
Roger Duane Milliman, Waterbury, Conn., assignor to Sylvania Electric Products Inc., a corporation of Delaware
Filed July 20, 1966, Ser. No. 566,636
Int. Cl. B23k 11/02
U.S. Cl. 219—103    12 Claims

ABSTRACT OF THE DISCLOSURE

A welding apparatus for handling a continuous length of metallic contact material wherein the strand of material is fed, welded and severed to provide welded contact areas on a related strip of metallic terminal material.

The apparatus incorporates fixed electrodes and utilizes press-operated common driving means which sequentially actuate feeding of the contact material, welding of discrete portions of the same to the terminal material, and severing of the welded contact material.

The invention relates to a machine for welding contacts onto strip material. In particular it deals with the welding of precious metal contacts such as gold onto a baser metallic strip which is subsequently shaped and severed to form an electrical terminal.

The welder herein is an improvement over the welder described in the patent to Gannoe 3,114,828, to which reference is made for fuller disclosure and comprehension of the locus of the invention.

Since the contacts are of a precious metal it is a desiratum that the minimum amount of the metal should be used consistent with the intended current carrying capacity of the terminal and that the amount of metal used be uniform for each terminal. It is therefore an object of this invention to provide a welder which can supply contact metal in uniform desired amounts to the terminal strip. Ancillary to this it is an object of the invention to provide a welder wherein the effective length of contact material brought into contact with the terminal strip may be made as short as desired. Also, in order to maintain this constant distance, it is an object of the invention to move as few parts as possible in the welding operation in order to maintain close tolerances in the application of the contact metal to the strip.

Further, it is an object of this invention to reduce the cost of servicing the welder by reducing the number of moving parts.

For a better understanding of the present invention, together with other and further objects, advantages, and capabilities thereof, reference is made to the following disclosure and appended claims in connection with the accompanying drawings in which:

FIG. 2 is a top plan view taken on the line 2—2 of FIG. 1;

FIG. 3 is an end elevational view, partly in section, taken on the line 3—3 of FIG. 2;

FIG. 4 is an enlarged horizontal sectional view taken on the line 4—4 of FIG. 1;

FIG. 5 is an enlarged fragmentary vertical sectional view taken on the line 5—5 of FIG. 1;

FIG. 6 is an enlarged fragmentary vertical sectional view taken on the line 6—6 of FIG. 1;

FIG. 7 is a horizontal sectional view taken on the line 7—7 of FIG. 6;

FIG. 8 is an enlarged vertical sectional view taken on the line 8—8 of FIG. 2;

FIG. 9 is a perspective view of one of the feeding discs pivot pins;

FIG. 10 is a fragmentary vertical sectional view taken on the line 10—10 of FIG. 6;

FIG. 11 is a perspective view of a bracket for supporting a feed disc and guiding a thrust bar;

FIG. 12 is a sectional view of an electrode construction with adjacent parts; and FIG. 13 is an exploded view of cutter blades utilized in the welder and associated supporting elements.

Figure 1:
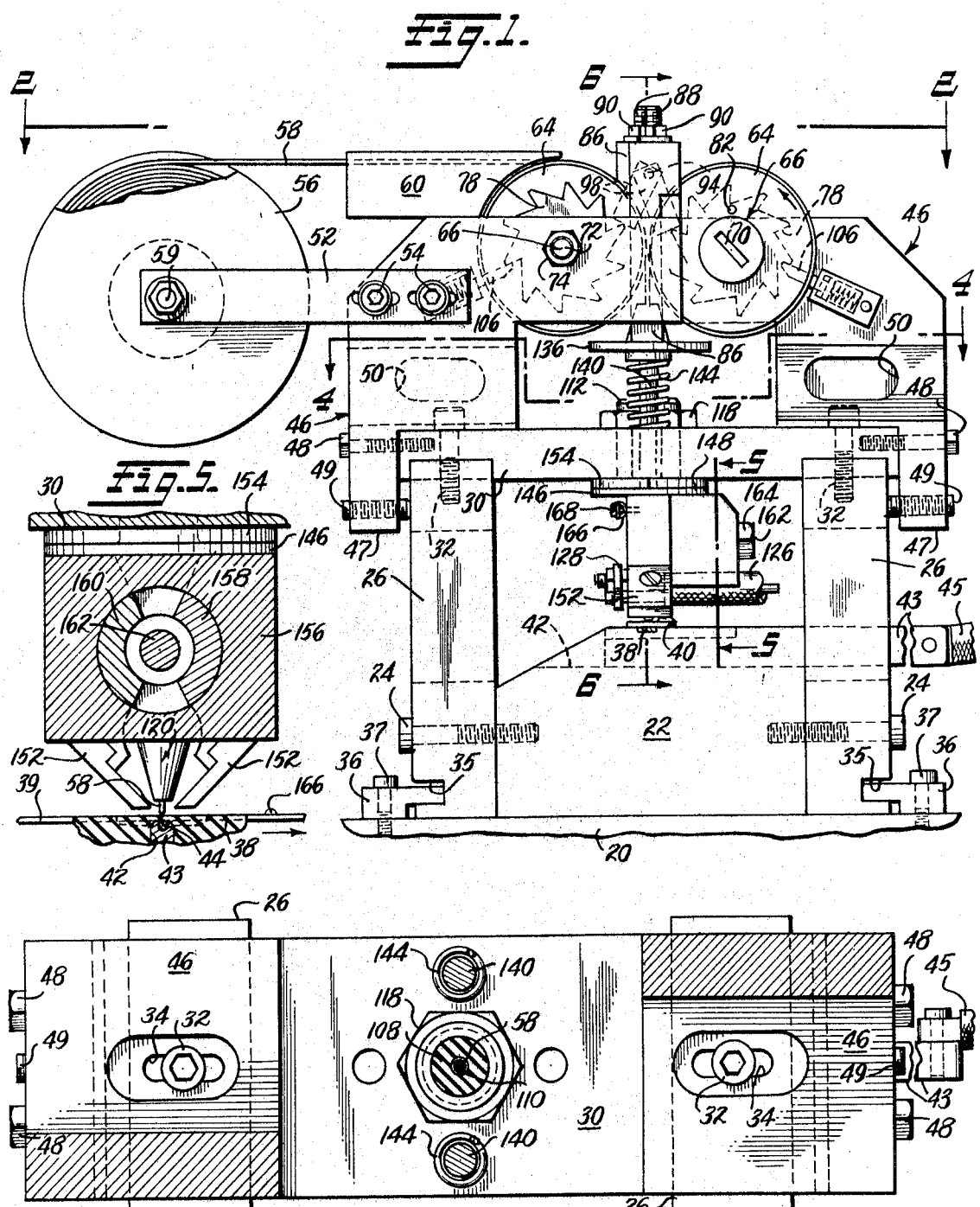
FIG. 1 is a front elevational view of the welder of the present invention.

Now referring to the drawings in greater detail, at 20, FIG. 1, is indicated the base of the machine. Atop the base is an electrode carrying block 22 of insulating material to which is fastened, by screws 24, a pair of upright rectangular frames 26, channeled at the top as shown at 28, FIG. 3, to support a bridge plate 30 fastened to the frames 26 by bolts 32, preferably in the form of socket head screws, threaded into the frames. The bolts 32 pass through slots 34, FIG. 4, in the bridge plate to enable longitudinal adjustment of the bridge plate. The block 22 and parts united thereto may be secured to the base of the machine in any desired manner. As here shown, the bottoms of the frames 26 are slotted as indicated at 35, each frame receiving an L-shaped clamping lug 36 fastened to the base of the machine by a bolt 37. This arrangement enables adjustment of the entire welding unit longitudinally of the base of the machine, that is, from right to left and from right to left of an operator standing facing the machine. The slotted bridge plate enables crosswise or front to back adjustment of contact location on the terminal strip.

Supported by the bridge plate are means to feed and guide the contact metal to the electrode carrying block as well as a welding electrode for cooperation with an electrode in the block 22. The contact carrying block on its upper surface, see FIGS. 1, 5 and 6, has a longitudinally extending channel 38 thru which the metallic strip material 39 to be ultimately formed into terminals is intermittently fed. A hold down plate 40 held to the block 22 by a screw 41 guides the strip material and holds it down in the channel as the strip is fed to the channel. Frictionally inserted into a deep channel 42, FIG. 6, at right angles to the strip material accommodating channel, is a bar 43 of copper or other high conductivity material rigidly carrying an electrode 44 of a harder metal. The exposed upper surface of the electrode is substantially at the level of the bed of the channel and forms the medium for effecting electrical connection between a flexible cable 45, FIG. 1, affixed in any suitable manner to the electrode bar 43. If the electrode 44 should become pitted or corroded, it may be adjusted crosswise or front to back of the machine to obtain a new contact point between the electrode and the intermittently movable strip material.

Fastened to each longitudinal end of the bridge plate 30 is an angled bracket 46. As here shown, a depending angled portion 47 of the bracket is fastened to the bridge plate by bolts 48. The bridge plate may be adjusted longitudinally with reference to the frames 26 by adjustment of set screws 49 threaded through the depending portions 47 and bearing against the frames 26. To enable this adjustment to be made the brackets 46 are through slotted, as indicated at 50, to enable a hex key to engage the bolts 32 to loosen them for adjustment of the bridge plate and to again tighten the screws down against the bridge plate.

The left-hand bracket 46, as viewed in FIG. 1, has adjustably fastened thereto a reel carrying bar 52 as by bolts 54 passing thru slots in the bar and thread into the bracket 46.

The bar, at its free end, carries a supply reel 56 for the contact metal, as gold wire 58. The wire on the reel is electrically insulated from the frame of the machine in any suitable manner as by insulating the pivot 59 from the bar or making the reel itself of insulating material. The gold wire is directed to the welding tool by a wire guide 60 having a channel in its upper surface of proper width to just freely accommodate the diameter of the wire and of sufficient depth to prevent the wire from escaping from the channel. The guide may be provided with means to insulate the wire from the channel walls or may itself be of insulating material and is fastened to the left-hand angled block 46 in any desired manner.

The guide is recessed at its forward end to freely accommodate one of a pair of wire feed wheels or discs 64, each mounted on a pivot pin 66 held fast in its associated bracket 46.

By inspection of FIGS. 2 and 3 it will be seen that the upper ends of the brackets are offset from each other and are on opposite sides of the longitudinal axis of the welder, provision being made for locating the discs 64 on the longitudinal axis of the machine. Each pivot pin 66, as seen more particularly in FIGS. 8 and 9 has an eccentric portion 68 so that by rotation of a pin or of both pins 66, the spacing between the discs 64 may be adjusted to properly engage the wire 58 to effect a feeding function thereof. To facilitate pivot pin adjustment, each pin is provided with a thumb and finger engageable or tool engageable bar 70 at one end of the pin, the other end being threaded as at 72 for engagement by a nut 74 for clamping the pivot pin to the associated bracket 46.

The periphery of each disc 64 is recessed to accommodate a ribbed feed tire 76 of rubber or other insulating material effective to frictionally engage the wire. When the discs are intermittently driven, as will be described, these tires frictionally engage the wire and force it downwardly toward and against the strip material 39 resting on the lower electrode 44. However, the adjustment of the discs toward each other is such that when the lower end of the wire is blocked against movement, the tires 76 will slip with respect to the wire, thereby maintaining a downward force on the wire and yet not feeding the same.

To drive the feed discs there is associated with each disc, in driving relation thereto, a ratchet wheel 78 mounted on the eccentric portion 68 of the associated pivot pin. The driving connection may be made in any suitable manner, as by a dowel 82 frictionally held in a hole in the ratchet wheel 78 and in a hole in the wire feed disc 64. To drive each ratchet wheel, each bracket is provided with a vertical guide way 84 for a slide 86, the top of each slide, FIG. 3, being fitted with an adjustable threaded driving pin 88 and a lock nut 90 for locking the pin in adjusted position with reference to the slide. A platen 92 of a press, in coordination with the movement of the rest of the machinery with which the welder is associated, is adapted to engage the pins 88 to force the same downwardly. The slides are returned upwardly by springs as will be described.

Pivoted to each slide as at 94, see FIGS. 6 and 10, in a recessed portion 96 of each slide is a ratchet driving pawl 98, the same being urged outwardly by a spring 100 seated in a recess in the pawl and against the end of a plug 102 in the slide, the plug being in the form of a screw to enable spring insertion and replacement, if needed. On the downward movement of the slide the pawl will engage a tooth of the ratchet and drive the ratchet and its associated wire feed disc. As the lower end of the pawl rides by one tooth, the planar side face 104 of the pawl will come into engagement with the edge of the said one tooth and the edge of the next tooth to thereby hold the disc against retrograde movement. In the meantime a locking dog 106 will be spring pressed into position beneath another tooth to prevent retrograde movement of the ratchet and disc. Upon upward movement of the slide, the pawl will spring out of the recess in the slide, ready for another intermittent movement of the feed disc. Since each slide has the same pawl arrangement and each disc its associated locking dog, both discs will be operated in the same manner.

The wire, upon being driven, passes downwardly through an electrically insulated tube 108 interiorly lined with an electrically conductive material 110, as of brass. The tube parts are mounted in a collar 112 interiorly threaded and engaging a threaded portion 114 on the exterior of the tube. The collar is also exteriorly threaded as at 116 and assembled through the bridge plate 30 and held in threaded engagement by a lock nut 118. The lower end of the tube is comprised of a steel collar 120 and a silver solder attached nib 122 of tungsten carbide. The liner 110 passes through the steel collar and is silver soldered into the carbide nib. The step 124 on the collar is press assembled into a mating opening in the insulated tube 108. The collar is electrically connected to a flexible cable 126, FIG. 1, by means of a strap 128, to one end of which the cable is electrically connected, the strap at its other end being connected to the steel collar by nut 132 engaging threaded stud 134 which is threaded into the collar. In operation, pressure exerted upon the fed wire upsets it to the extent that it contorts and makes contact at several points along the inside wall of the liner 110.

The press machine crankshaft is provided with a cam to intermittently close a circuit to the welding transformer, all of which is not shown since it is conventional in the art. The timing of the machine is such that the switch to the welding transformer is closed momentarily, only after the wire is pressed against the terminal strip and prior to a cutting off of the wire, as will be described. Because the wire is pressed down hard against the strip while the welding current is applied to the electrodes from the transformer, a good weld is effected. The pressing down on the wire also insures contact of the terminal strip with the lower electrode. It is to be noted that the electrodes are immovable, thereby insuring a better weld than when these parts are in motion.

The mechanism for cutting the wire after the weld has been effected includes an equalizer washer 136, FIG. 6, slidable on the tube 108, the washer being depressed during downward movement of the slides 86. The washer is perforated at diametrical areas as indicated at 138 to accommodate the upper ends of pins 140, these pins being provided with shoulders 142 to limit movement of the pins relative to the washer. Between the shoulders and the bridge plate 30 and surrounding each of the pins is a coil spring 144 tending to maintain the washer and the slides 86 in elevated position. The lower ends of each pin, as it passes through an aperture 146 in the flange 148 of the collar 112 descends and engages the upper flat surface of a cutter blade carrier 150, each of which has screwed to it a cutter blade 152, the bevelled edges of the two cutter blades, in operation, just coming into contact with one another and effecting the severance of the wire 58. The parts are so adjusted that the blades come together at a fixed desired height above the block 22. To attain this height, a desired thickness of split washer 154, which may have been ground to desired thickness, is inserted between the upper surface of flange 148 of the collar and the under side of bridge plate 30, this split washer having apertures aligned with the apertures through bridge 30 and flange 148. If desired, additional shimming can be resorted to in order to obtain the precise length of cut off portion of contact wire desired.

Integrated with the collar 112, as by being welded or brazed to the lower face of the flange 148, FIG. 13, is a bearing 156 in which there rotates the cylindrical shanks 158 of the cutter blade carriers 150. Each of these shanks is of cylindrical exterior contour to fit the bearing and of less than 360° in extent so that the shanks may be rotated with respect to each other in the bearing to carry the blades toward and away from each other. Each shank terminates in an inturned lip 160 of the same arcuate extent as the shank and a spacer or shoulder bolt 162 whose threaded end passes through the space provided interiorly of the shanks, past the lips and extends beyond the bearing 156, serves to rotatably hold the carriers in place, the headed end of the bolt engaging the flat exposed surfaces of the lips and the threaded end receiving a nut 164 to fasten the bolt in place. The threaded end is smaller in diameter than the shank of the bolt so that the bolt does not bind on the lips. The cutters themselves can adjust themselves to the wire to properly cut the same since the drive to the cutter blades is thru the equalizer washer 136 which may tilt as necessary to accommodate shift in position of the bite of the blades. The blades normally are maintained spaced apart by reason of the use of a light spring 166 stretched between screws 168, each screw being mounted on a cutter blade carrier above the axis of the rotation of the carrier.

As stated heretofore, the cutting of the wire follows the welding operation. Because the cutter blades may be placed as close as desired to top of block 22, the contact piece on the terminal strip is always of the same height. A good weld is effected by reason of the thrust action of the contact wire against the strip before and during and after the welding operation and by reason of the absence of moving parts during the time when the actual weld is taking place.

While there have been shown and described what are at present considered the preferred embodiments of the invention, it will be obvious to those skilled in the art that various changes and modifications may be made therein without departing from the invention as defined by the appended claims.

What is claimed is:

1. A press-operated apparatus having driving means for handling a continuous length of metallic contact material whereby the material is fed, welded and severed to provide welded contact areas on a related strip of metallic terminal material, said apparatus comprising:
   a base;
   an upright frame means mounted on said base means;
   structural means comprising a bridge plate horizontally oriented in a slidable manner on said frame means to effect crosswise positional adjustment and securement thereon;
   a stationary bottom electrode supported on said base and formed to accommodate the passage of said strip of terminal material thereover;
   an upper electrode arrangement positioned in said bridge plate above said bottom electrode in fixed spatial relationship thereto, said upper electrode having an elongated electrode body with a provision therein for accommodating the passage of said contact material therethrough;
   contact material feeding means actuated by press operated driving means in a manner to frictionally engage and move a longitudinal portion of said contact material to and through said upper electrode body in a manner to make electrical contact therewith and thence to discretely position a section of said contact material to make contact with said strip of terminal material on said bottom electrode;
   electrical means associated with said bottom and upper electrodes for effecting a weld while said contact material and said terminal material are in engagement with each other; and
   cutting means mounted in fixed relationship to and beneath said bridge plate and oriented adjacent to where said contact material comes to rest for said welding operation, said cutting means being actuated by said press-operated driving means after said weld has been effected to sever said contact material close to said weld.

2. The apparatus as set forth in claim 1 in which the upper electrode is an elongated element and wherein the frictional engagement of said feeding means is sufficient to contort the contact material so as to cause it to contact at spaced points along its length with the upper electrode.

3. The apparatus as set forth in claim 1 in which the upper electrode arrangement includes an elongated conductive liner electrically connected to one pole of a source of welding current, said liner being fixed and in position to engage the contact wire when it is contorted by pressure against the contact material created by feeding the contact material.

4. The apparatus as set forth in claim 1 wherein there is spacing means between the cutting means and the bridge plate to accurately position the cutting means above the base.

5. The apparatus as set forth in claim 1 in which the cutting means includes a pair of cutter blades each mounted on a pivoted carrier, said carrier being each operated by a pin whose upper ends engage an equalizer washer, said washer being driven in one direction by part of said driving means which moves the contact material.

6. The structure of claim 5 wherein a spring associated with each pin restores the pin and equalizer washer to a normal raised position with the pin out of contact with the blade carrier.

7. The apparatus as set forth in claim 1 in which the driving means includes a slide, a pawl mounted on the slide, and a ratchet wheel driven by the pawl, said ratchet wheel being affixed to one of the parts in frictional engagement with the contact material.

8. The apparatus as set forth in claim 7 in which the slide comprises means to engage the cutting means to move the same so as to sever the contact material.

9. The apparatus as set forth in claim 7 in which the pawl after driving the ratchet wheel, engages two adjacent teeth of the ratchet wheel to impede movement of the ratchet wheel.

10. The apparatus as set forth in claim 7 in which the part in frictional engagement with the contact material is a disc having a tire of rubber-like material engaging the contact material.

11. Welding apparatus comprising a base, an electrode carrying block on said base, a lower electrode in said block crosswise of the block, a longitudinal channel in the upper face of said block for guiding a terminal strip over and in contact with the lower electrode, the upper surface of said electrode being substantially in the plane of the base of the channel, a pair of upright rectangular frames secured to said block, a bridge plate longitudinally slidably mounted on said frames, means for crosswise adjusting the position of said bridge plate in said frames and securing the same in adjusted position, means for locking the bridge plate in adjusted position, means for clamping the frames to the base in an adjusted position of the frames lengthwise of the base, a cutter mechanism including cutter blades supported by the bridge plate, and at an elevation below the bridge plate, a tube supported by said ridge plate, an upper liner electrode arrangement within the tube, said tube terminating at an elevation above the lower level of the cutter blades, a pair of brackets affixed to said bridge plate, each bracket carrying an adjustable eccentrically mounted pivot pin, a ratchet driven rubber tired disc mounted on each pin, a pair of slides, one for each bracket and vertically slidable in the bracket, each slide having a spring pressed pawl for driving engagement with a ratchet and engageable with a pair of teeth of the ratchet for eliminating loose play of the discs, a locking dog engageable with each ratchet to prevent retrograde movement of an associated disc upon retroactive movement of a slide, an adjustable platen engaged pin at the upper end of each slide, a guide for a contact wire mounted on one of said brackets, means for supplying contact wire to said guide, said wire passing between the bite of the two rubber tired discs down the tube, through and in contact with the upper electrode arrangement, past the lower ends of the cutter blade and into contact with the terminal strip, means for insulating the contact wire from parts of the welding apparatus, said contact wire and terminal strip during downward motion of the slides being welded together, and means during the continued downward motion of the slides to move the cutter blades to sever the contact wire above the weld.

12. The structure of claim 11 wherein the means operative during continued downward motion of the slides to move the cutter blades include an equalizer washer slidable on the tube and engaged by said slides, pins driven by said washer, the pins being in position to pass through apertures in the bridge plate, the cutter blades being mounted on pivotal carriers, the pins when driven downwardly engaging the carriers to rotate them, coil springs surrounding the pins reaching between the pins and the bridge plate to raise the pins, equalizer plate and slides to their upper positions with the pawls on the slides free of the ratchet teeth, and spring means to return the carrier to original position with the cutter blades separated from one another.

References Cited

UNITED STATES PATENTS

| | | | |
|---|---|---|---|
| 2,339,884 | 1/1944 | Schlumpf | 219—103 X |
| 2,734,119 | 2/1956 | Pityo | 219—103 X |
| 3,114,828 | 12/1963 | Gannoe | 219—103 |
| 3,299,246 | 1/1967 | Wahl | 219—103 X |

JOSEPH V. TRUHE, Primary Examiner

L. A. SCHUTZMAN, Assistant Examiner

U.S. Cl. X.R.

219—57, 78